April 2, 1968     E. A. MUIJDERMAN     3,376,083
AXIAL BEARING

Filed March 1, 1966                                    4 Sheets-Sheet 1

INVENTOR
EVERHARDUS A. MUIJDERMAN
BY

AGENT

April 2, 1968  E. A. MUIJDERMAN  3,376,083
AXIAL BEARING

Filed March 1, 1966

INVENTOR
EVERHARDUS A. MUIJDERMAN
BY
AGENT

April 2, 1968  E. A. MUIJDERMAN  3,376,083
AXIAL BEARING
Filed March 1, 1966  4 Sheets-Sheet 4

INVENTOR.
EVERHARDUS A. MUIJDERMAN
BY
AGENT

United States Patent Office 3,376,083
Patented Apr. 2, 1968

3,376,083
AXIAL BEARING
Everhardus Albertus Muijderman, Emmasingel, Eindhoven, Netherlands, assignor to North American Philips Company, Inc., New York, N.Y., a corporation of Delaware
Filed Mar. 1, 1966, Ser. No. 530,925
Claims priority, application Netherlands, Mar. 27, 1965, 65—3,950
5 Claims. (Cl. 308—9)

ABSTRACT OF THE DISCLOSURE

A hydrodynamic axial bearing for a rotating shaft. The bearing is defined by the confronting surfaces of a support member and a pressure member between which a lubricant is supplied. A first and second pattern of shallow grooves is located in one of the confronting surfaces. The grooves of the first pattern extend in a direction opposite to the grooves of the second pattern such that the grooves of the first pattern will force the lubricant radially inwardly during clockwise rotation and the grooves of the second pattern will force the lubricant radially inwardly during rotation in a counter-clockwise direction.

---

The invention relates to an axial bearing for a rotary shaft, comprising a stationary supporting member, a pressure member cooperating with the supporting member, a lubricant between said members and one of these members being provided with symmetrical regularly distributed shallow grooves in a surface between said members so that upon relative rotation of the members hydrodynamic lubrication is obtained.

The load capacity of these bearings is very high and the friction coefficient is low with respect to other known hydrodynamically operating bearings. However, grooved bearings are only suitable for one direction of rotation of the shaft, that is to say for that direction of rotation in which medium is pushed into the grooves.

The invention has for an object to provide a bearing of the type described which is suitable as an axial bearing for either a clockwise or counterclockwise rotation.

The invention is based on recognition of the fact that the loss of load capacity owing to the negative pressure in a pattern of grooves is largely neutralized by the load capacity of the pattern of grooves in which a positive pressure prevails, with the use of an evaporating medium such as oil, gas and so on, the negative pressure in one pattern of grooves can at the most become equal to the vapour pressure of the viscous medium, while the positive pressure in the other pattern of grooves may have a large value, as a result of which the bearing has a high positive load capacity for both directions of rotation. Also when gas is used as a viscous medium, it has been found to be possible with a favorable shaping of the groove patterns to develop a load capacity for both directions of rotation of the bearing.

The grooves in the bearing may take, for example, the form of a herringbone pattern, or they may consist of straight lines crossing the center line of the bearing at an angle. However, according to the invention, the center lines of the grooves of the two patterns of grooves preferably take the form of logarithmic helices and the patterns of grooves are shaped so that in the direction of rotation of the pressure member suitable for each individual groove they push the viscous medium towards the center of the bearing. A duct is provided between the two patterns of grooves for supplying a viscous medium to both pattern of grooves. In this embodiment, the bearing has a maximum load capacity and minimum frictional resistance.

The invention will now be described more fully with reference to the drawing.

Figure 1:
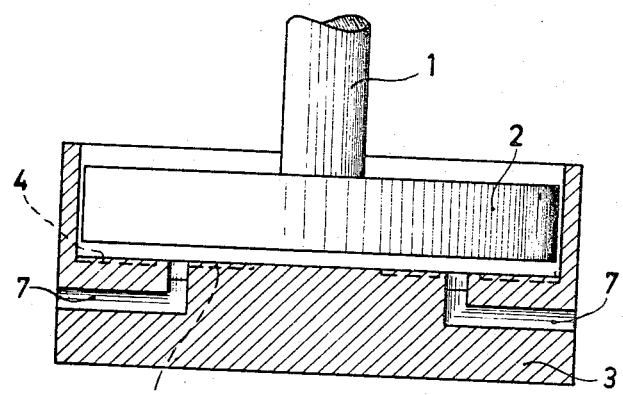
FIG. 1 shows a flat bearing in accordance with the invention provided with grooves in the form of logarithmic helices.
Figure 2:
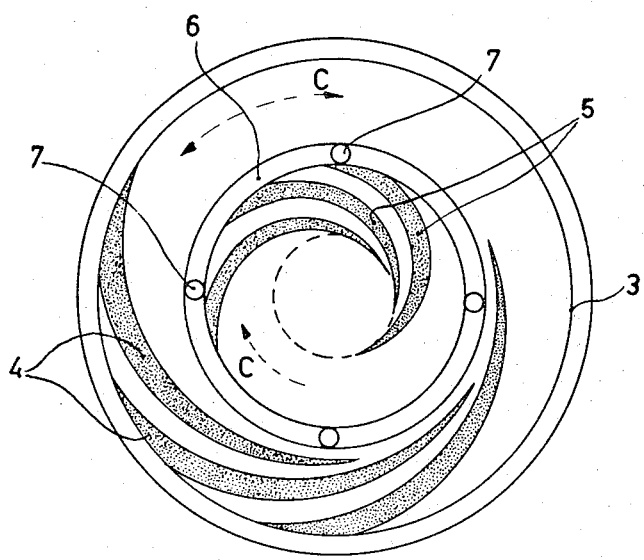
FIG. 2 is a plan view of the supporting member of FIG. 1.

The flat bearing shown in FIG. 1 has a shaft 1 provided with a pressure member 2 which has a disc-shaped flat surface cooperating with a supporting member 3. The supporting member 3 is provided with an outer pattern of grooves 4 and an inner pattern of grooves 5 (FIG. 2). The center lines of the grooves 4 and 5 have the form of logarithmic helices extending in opposite directions in each group of grooves. An annular duct 6 for supplying a viscous medium such as oil or gas to the pattern of grooves 5 is located between the patterns of grooves 4 and 5. The lubricating medium is supplied to annular duct 6 through a plurality of radial apertures 7. Medium can be supplied to the apertures 7 in a simple manner, which is not shown in the drawing.

Upon rotation of the pressure member 2 in the counterclockwise direction, for example, lubricant is forced from the outside in of the grooves 4 of the bearing, as a result of which a positive pressure is produced in these grooves. With the use of oil and the like, this positive pressure materially exceeds the ambient pressure, for example, on the order of from 5 to 250 atmospheres depending on speed, load number of grooves, etc. A negative pressure is produced at the same time in the inner grooves 5. With the use of an evaporating medium such as oil, this negative pressure cannot become lower than the vapour pressure of the medium. As a whole, the bearing has a favorable positive load capacity. With the use of a gas as a viscous medium or lubricant, the positive pressure in one of the patterns of grooves attains a value lower than with oil. The value of the negative pressure in the other pattern of grooves can be kept comparatively low, however, by suitable shaping.

When the pressure member 2 rotates in a clockwise direction lubricant is now forced from the outside in of the inner grooves 5. A hydrodynamic lubricating film is now formed in this portion of the bearing. Consequently, a positive pressure is produced in the inner part grooves 5 of the bearing, while a negative pressure is produced in the grooves 4 which again cannot be lower than the vapour pressure of the oil. The two patterns of grooves can be shaped so that the load capacity of the bearing is equal for both directions of rotation. However, the grooves may alternatively be shaped so that for one direction of rotation the bearing develops a higher load capacity than for the other direction of rotation.

Figure 3:
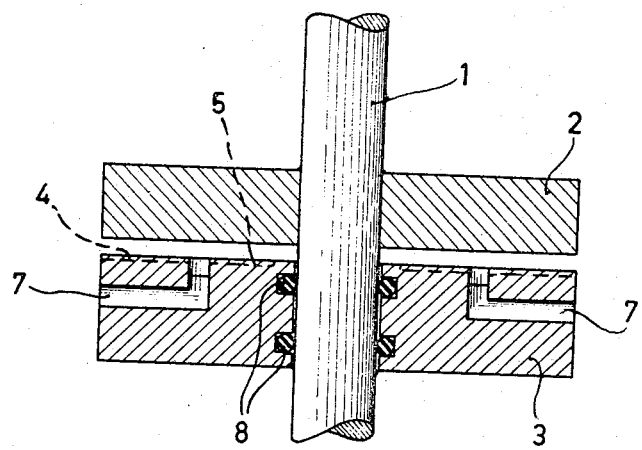
FIG. 3 shows a bearing with a shaft passed through the supporting member.

The shaft 1 may also be passed through the supporting member 3, as shown in FIG. 3. It is advantageous for producing a positive pressure in the inner pattern of grooves 5 to provide between the shaft 1 and the supporting member 3 a sealing member 8. However, this is not absolutely necessary for the operation of the bearing.

Figure 4:
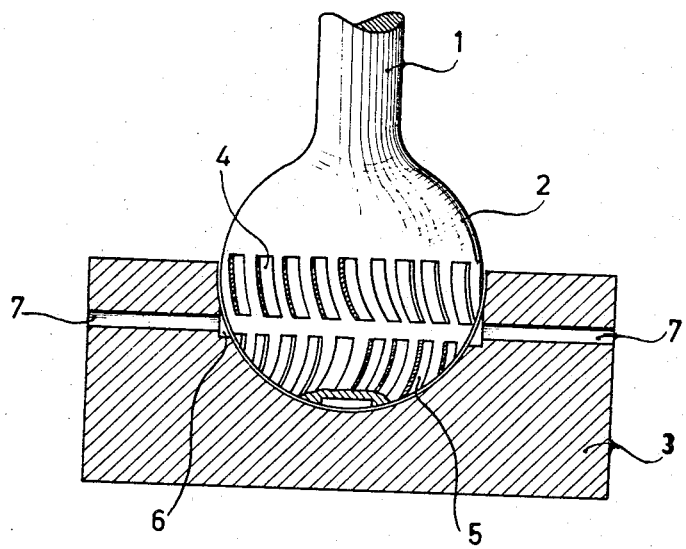
FIG. 4 shows a spherical bearing.
Figure 5:
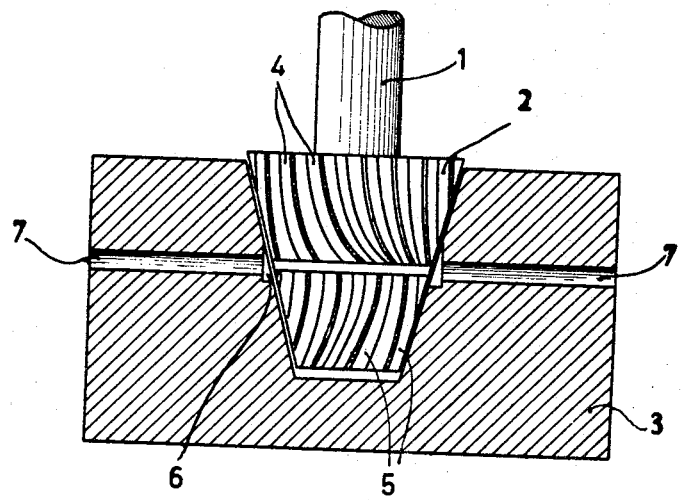
FIG. 5 shows a conical bearing with helical grooves.

The bearing surface of the supporting member and of the pressure member may have the form of any surface of revolution FIG. 4 shows a spherical bearing in accordance with the invention in which helical patterns of grooves 4 and 5 are disposed in the pressure member 2. The operation is the same as that of the flat bearing described with reference to FIGS. 1 and 2. The load capacity of a spherical bearing with helical grooves is very high. FIG. 5 further shows a conical bearing with helical grooves. Just as the spherical bearing of FIG. 4, such a bearing can absorb not only axial forces but also radial forces.

Figure 6:
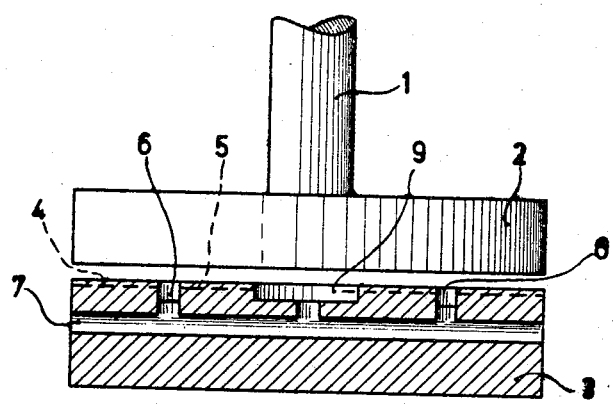
FIG. 6 shows a flat bearing with grooves in a herringbone pattern, as shown in FIG. 7.
Figure 7:
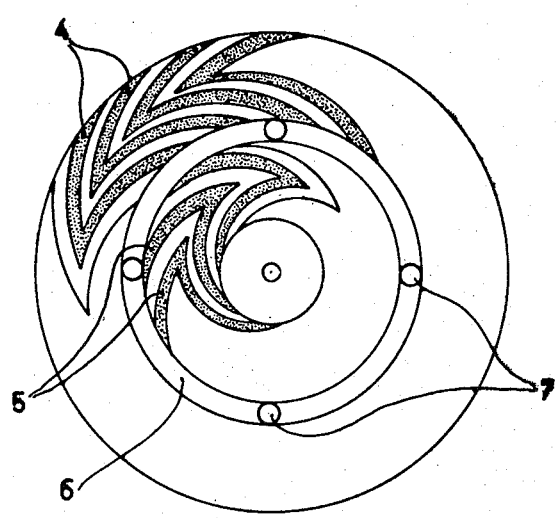

FIGS. 6 and 7 show a flat bearing in which the grooves do not take the form of a logarithmic helices but of a herringbone. In order that this bearing operates satisfactorily, the medium, for example, oil must be supplied at both ends of the grooves 4 or 5. Upon rotation of the pressure 2 in a counterclockwise direction the medium is urged into the grooves 4 both from the outer side of the bearing and from the duct 6. A negative pressure is produced in the pattern of grooves 5. Upon rotation of the pressure member 2 to a clockwise direction, medium is urged into the grooves of the inner pattern of grooves 5 from the ducts 6 and 9. In this embodiment, an additional duct 9 for supplying the viscous medium must be available.

Figure 8:
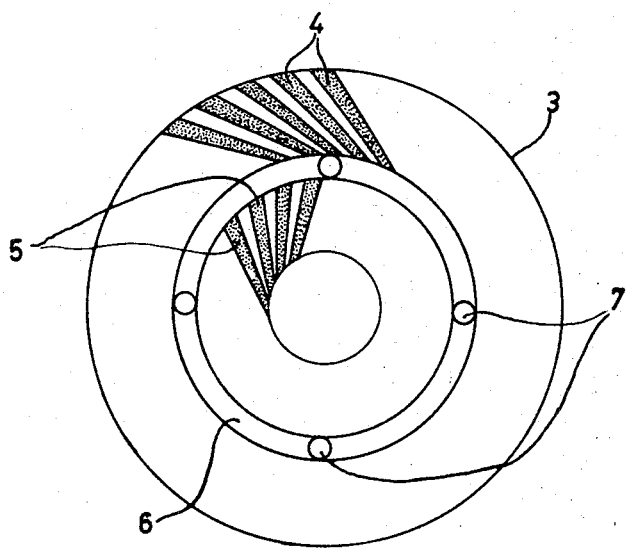
FIG. 8 is a plan view of the supporting member of a flat bearing with straight grooves.

Furthermore, the grooves may have a form different from a logarithmic helix or a herringbone. For example, the center lines of the grooves may consist of circles in order to approach the form of a helix. Use may alternatively be made, for example, of straight grooves, as shown in FIG. 8, in which the straight grooves are disposed so that they urge medium into the grooves in the individually suitable direction of rotation. Grooves in the form of logarithmic helices shaped in the correct manner provide the maximum load capacity for the bearing.

The grooves may be disposed in the pressure member 2 or in the supporting member 3. The operation of the bearing is not influenced thereby.

As a viscous medium, use is preferably made of oil or grease but also other media such as water, air etc. are suitable for use as lubricant.

What is claimed as new and useful and secured by Letters Patent of the United States is:

1. A spiral groove axial bearing comprising: a pressure member, a support member co-axial with said pressure member and having one surface in confronting complementary relationship to one surface of said pressure member, a shaft coupled to said pressure member and co-axial therewith, means for supplying a lubricant between said confronting complementary surfaces, a first pattern of groove means located on one of said confronting surfaces for forcing said lubricant substantially radially inwardly along said confronting complementary surfaces when said shaft rotates in a clockwise direction, and a second pattern of groove means concentric with and radially spaced from said first pattern of groove means for forcing said lubricant substantially radially inwardly along said confronting complementary surfaces when said shaft rotates in a counter-clockwise direction.

2. A spiral groove axial bearing according to claim 1 wherein: said groove means of said first and second patterns comprise a plurality of shallow grooves, and said shallow grooves of said first pattern extend in a direction opposite to the direction of said shallow grooves of said second pattern.

3. A spiral groove axial bearing according to claim 2 wherein the width of said grooves of the first and second patterns narrows the radially inward extent of said grooves.

4. A spiral groove axial bearing according to claim 2 wherein said first and second plurality of grooves have center lines defining logarithmic helices.

5. A spiral groove axial bearing according to claim 2 wherein at least one of said first and second plurality of grooves have a herringbone pattern.

References Cited
UNITED STATES PATENTS
2,249,843  7/1941  Marsland _____ 308—122

MARTIN P. SCHWADRON, *Primary Examiner.*

FRANK SUSKO, *Examiner.*